UNITED STATES PATENT OFFICE.

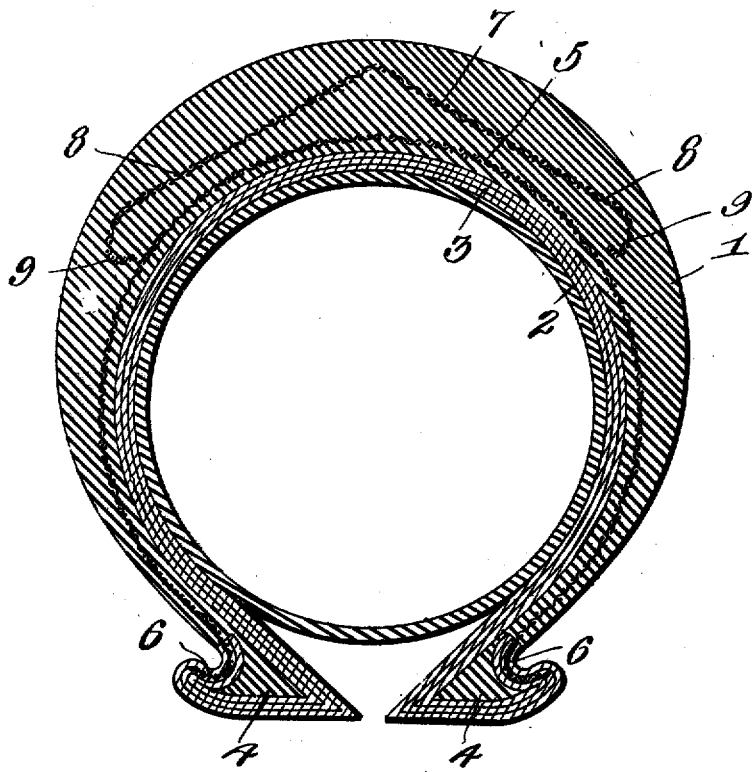

HARRY WILSON AND CARL GUDER, OF McKEESPORT, PENNSYLVANIA.

VEHICLE-TIRE.

1,007,018.  Specification of Letters Patent.  Patented Oct. 24, 1911.

Application filed July 12, 1911. Serial No. 638,106.

*To all whom it may concern:*

Be it known that we, HARRY WILSON and CARL GUDER, citizens of the United States, residing at McKeesport, in the county of Allegheny and State of Pennsylvania, have invented certain new and useful Improvements in Vehicle-Tires, of which the following is a specification, reference being had to the accompanying drawings.

This invention relates to new and useful improvements in vehicle tires, and more particularly to improvements in pneumatic tires of either the "single tube" or "double-tube" type.

The object of the invention is to protect the fabric body of the outer tire casing and reinforce the latter for the purpose of preventing punctures and blow-outs, and at the same time providing a tire casing which is capable of sustaining a high degree of pressure applied to the air used to inflate the tire.

Another object is to provide a tire of this character which will possess advantages in points of efficiency and durability, is inexpensive of manufacture and at the same time is simple in construction and operation.

With the above and other objects in view, the invention consists of the novel features of construction, combination and arrangement of parts hereinafter fully described and claimed, and illustrated in the accompanying drawings, in which there is illustrated a vertical transverse sectional view of a tire constructed in accordance with our invention.

The present embodiment of the invention shows a tire of the "double-tube" type consisting of a sheath or tire casing 1 and an inner inflatable tube 2. The sheath or tire casing may be reinforced in any suitable and convenient manner by means of a canvas fabric body comprising layers of fabric 3, suitably disposed and incorporated and extending into the heel portions 4 of the tire casing as shown. As a means for effectually reinforcing the outer tire casing and protecting the fabric body 3 and inner tube 2, a metallic armor fabric 5 is embedded and vulcanized therein, said armor fabric comprising a close-mesh of woven wire, which extends throughout the tire casing longitudinally and transversely. The transversely disposed side portions, preferably extend in the heel portions 4, terminating in the hooked portions 6 effectually reinforcing the heel portions of the tire casing and securely anchoring said armor fabric and strengthening the tire casing for the purpose of preventing blow-outs. A second armor fabric 7 is embedded and vulcanized in the tire casing and disposed on the outside of the fabric 5, this second armor fabric comprising a close-mesh of woven wire fabric and embedded in the tire and arranged V shaped in cross-section so as to form the transversely inclined sides 8. The terminating ends of the sides are bent to form hook portions 9 to securely anchor the sides 8. This fabric 7 is to be flexible and pliable so that when any great pressure is on the tread of the tire casing the fabric will bend according to the pressure and by having the inclined sides 8, if any sharp pointed object such as a nail or large piece of glass should pierce the tire casing they will be warded off and prevent them from reaching the inner tube. It will be seen that with the use of this second or outside armor fabric the inner tubes used in the double-tire type will be of much longer duration than they are with the common tire casing used at the present time. These armor fabrics are to be used with a single type as well as double and will make the tire absolutely puncture-proof.

From the foregoing description taken in connection with the accompanying drawings, the operation and advantages of our invention will be readily understood.

While we have shown and described the preferred form of our invention it will be obvious that various changes in the details of construction and in the proportions may be resorted to for successfully carrying out invention into practice without sacrificing any of the novel features or departing from the scope thereof.

Having thus described the invention what is claimed is:—

An automobile tire comprising a casing; a reinforcing for said casing comprising a canvas fabric body suitably disposed and incorporated within said casing, an armor fabric embedded within said casing and extending into the heel portions thereof and disposed above said reinforcing fabric, hooked portions formed on the termination of the side portions of said armor fabric, a second armor fabric embedded and vulcanized in the tire casing and disposed above the first armor fabric, said second armor fabric being V shaped in cross-section with inclined sides formed thereby to ward off any sharp point which might pierce the casing and hooked portions formed at the termination of the sides to securely anchor said second armor fabric.

In testimony whereof we hereunto affix our signatures in the presence of two witnesses.

HARRY WILSON.
CARL GUDER.

Witnesses:
ISRAEL A. SIMON,
EDWARD C. KEARNEY.